(12) United States Patent
Hamada et al.

(10) Patent No.: US 8,422,098 B2
(45) Date of Patent: Apr. 16, 2013

(54) DOCUMENT DATA CAPTURING DEVICE

(75) Inventors: Masataka Hamada, Fuefuki (JP); Seiji Nishizawa, Chuo (JP); Yutaka Tanaka, Minami-Alps (JP); Kazuhisa Mochizuki, Minamikoma-gun (JP)

(73) Assignee: Nisca Corporation, Minamikoma-gun (JP)

( * ) Notice: Subject to any disclaimer, the term of this patent is extended or adjusted under 35 U.S.C. 154(b) by 869 days.

(21) Appl. No.: 12/344,520

(22) Filed: Dec. 28, 2008

(65) Prior Publication Data

US 2009/0168127 A1 Jul. 2, 2009

(30) Foreign Application Priority Data

Dec. 28, 2007 (JP) ................................. 2007-340164

(51) Int. Cl.
| G06F 3/12 | (2006.01) |
| H04N 1/04 | (2006.01) |
| H04N 1/46 | (2006.01) |
| H04N 1/40 | (2006.01) |
| H04N 1/21 | (2006.01) |
| G03F 3/08 | (2006.01) |
| G06K 15/00 | (2006.01) |
| G06K 9/00 | (2006.01) |
| G03B 27/32 | (2006.01) |
| B65H 85/00 | (2006.01) |
| B65H 1/08 | (2006.01) |
| G03G 15/00 | (2006.01) |

(52) U.S. Cl.
USPC ........... 358/498; 358/474; 358/518; 358/497; 358/1.2; 358/488; 358/1.16; 358/505; 358/449; 358/1.1; 358/296; 355/23; 355/24; 382/318; 382/167; 271/3.14; 271/3.01; 271/127; 399/16; 399/21; 399/381

(58) Field of Classification Search ................... 358/498, 358/474, 518, 511, 497, 1.2, 1.16, 488, 505, 358/449, 1.1, 296; 382/318, 167; 355/23, 355/24; 271/3.14, 3.01, 127; 399/16, 21, 399/381
See application file for complete search history.

(56) References Cited

U.S. PATENT DOCUMENTS

| 7,933,052 B2* | 4/2011 | Hamada et al. ................ 358/498 |
| 2005/0073695 A1* | 4/2005 | Nacman et al. ................ 358/1.2 |

(Continued)

FOREIGN PATENT DOCUMENTS

| JP | S62-222769 A | 9/1987 |
| JP | H09-046472 A | 2/1997 |

(Continued)

*Primary Examiner* — Charlotte M Baker
*Assistant Examiner* — Rury Grisham
(74) *Attorney, Agent, or Firm* — Judge Patent Associates

(57) ABSTRACT

A document data capturing device includes a sheet supply tray for carrying documents, a sheet discharge tray located below the sheet supply tray, and a document conveying mechanism including a conveying path along which documents are guided from the sheet supply tray to the sheet discharge tray. The document data capturing device includes a first data-capturing unit and a second data-capturing unit which scan respective sides of a document conveyed by the document conveying mechanism. The first data-capturing unit and the second data-capturing unit are each configured with a reduction-optics scanning mechanism. The conveying path along which a document to be scanned by the first and second scanning mechanisms is conveyed is formed to surround the second reduction-optics data-capturing unit. Thus, the device can be made compact.

9 Claims, 4 Drawing Sheets

U.S. PATENT DOCUMENTS

2005/0269759 A1* 12/2005 Sano et al. .................. 271/3.01
2006/0061839 A1* 3/2006 Hiraoka et al. .............. 358/498
2008/0158621 A1* 7/2008 Hamada et al. ............. 358/498

FOREIGN PATENT DOCUMENTS

| | | |
|---|---|---|
| JP | H11-069087 A | 3/1999 |
| JP | 2000-354139 A | 12/2000 |
| JP | 2004-193899 A | 7/2004 |
| JP | 2005-035756 A | 2/2005 |
| JP | 2005-035757 A | 2/2005 |
| JP | 2006-093790 A | 4/2006 |
| JP | 2007-096662 A | 4/2007 |

* cited by examiner

DOCUMENT DATA CAPTURING DEVICE

BACKGROUND OF THE INVENTION

1. Technical Field

The present invention relates to document data capturing devices that digitally capture data from both sides of a document, and specifically relates to layout configurations for document data capturing devices furnished with a document conveying mechanism.

2. Description of the Related Art

Conventionally known document data capturing devices that capture data from duplex (two-sided) documents having images formed on both sides include devices furnished with a reversing mechanism for turning documents upside-down, and that after conveying a document to a data-capturing unit to scan one side of the document, turn the document upside down and convey the document to the data-capturing unit again to scan the other side of the document, and devices furnished with a first data-capturing unit for scanning one side of the document, and a second data-capturing unit for scanning the other side of the document, wherein a document is scanned by the first and second data-capturing units.

Document data capturing devices of the latter type are disclosed in, for example, Japanese Unexamined Pat. App. Pub. Nos. H09-46472 and H11-69087. In these document data capturing devices, a first data-capturing unit is provided along an upper side of the document data capturing device body. A second data-capturing unit is provided in a document feeding device hinged onto the document data capturing device body. The second data-capturing unit, provided in the document feeding device, is arranged upstream of the first data-capturing unit and in a vertical conveyance section inside a U-shaped document conveying path. In this configuration, the first and second data-capturing units simultaneously scan the respective sides of a document being conveyed along the conveying path.

In the above-described document data capturing devices, however, a first scanning mechanism, for capturing data from documents passing through the first data-capturing section, is configured with data-capture sensors in a reduction-optics system, while a second scanning mechanism, for capturing data from documents passing through the second data-capturing section, is configured with data-capture sensors in a 1× optics system, as a consequence of which, when both a one side and the other side of a document are printed on a copy sheet, the problem of the tones, contrasts, etc. of the two sides not matching arises. What is more, with the 1× optics data-capture sensors the focal length is short, such that conveying documents within the focal length is extremely problematic. Consequently, in recent years the general practice has been to configure both the first and the second scanning mechanisms with reduction-optics data-capture sensors.

Nevertheless, configuring the first and the second scanning mechanisms both with reduction-optics data-capture sensors entails employing a plurality of mirrors, requiring a lengthy optical pathway, on account of which the issue of the device being scaled up arises. Moreover, the first and the second scanning mechanisms both being configured with reduction-optics data-capture sensors has not in fact meant that the image quality of a print image captured by the first scanning mechanism adequately matches that of a print image captured by the second scanning mechanism.

BRIEF SUMMARY OF THE INVENTION

The present invention has been brought about in view of such problems. An object of the present invention is in document data capturing devices including a first scanning mechanism and a second scanning mechanism each configured with data-capture sensors in reduction-optics systems, to afford a document data capturing device wherein scaling down of the device has been made possible. Another object of the present invention is to provide a document data capturing device that allows image quality to be improved so that the image quality of a print image captured by the first scanning mechanism is the same as that of a print image captured by the second scanning mechanism.

To accomplish the object, a document data capturing device according to a first aspect of the present invention includes a first scanning mechanism and a second scanning mechanism for capturing data from respective sides of a document, wherein a conveying path along which the document is conveyed is formed to surround the second scanning mechanism, and a detection section detecting shingle-feeding of documents is disposed in a part of the conveying path which is located above the second scanning mechanism, and wherein a first scanning section allowing a first scanning mechanism to read one side of the document is disposed in a part of the conveying path which is located below the second scanning mechanism, and a second scanning section allowing a second scanning mechanism to read the other side of the document is disposed in a part of the conveying path which is located on a side of the second scanning mechanism.

Furthermore, in a document data capturing device according to a second aspect of the present invention, a conveying path along which the document is conveyed is formed to surround the second scanning mechanism, and an optical pathway in the second scanning mechanism is configured to be different from that in the first scanning mechanism and to have an optical pathway length equal to that of the optical pathway in the first scanning mechanism.

According to the first aspect of the present invention, the conveying path is formed to surround the second scanning mechanism, and the shingle-feeding detection section is provided in the part of the conveying path which is located above the second scanning mechanism. The first scanning section is provided in the part of the conveying path which is located below the second scanning mechanism, and the second scanning section is provided in the part of the conveying path which is located on the side of the second scanning mechanism. Thus, the apparatus can be made compact without the need to extremely increase the size of the apparatus in one direction.

According to the second aspect of the present invention, the conveying path is formed to surround the second scanning mechanism, and the two scanning mechanisms are composed of the different optical pathways with the equal optical pathway length. Thus, the apparatus can be more freely designed and made compact. Furthermore, the same reading components can be used for the two reading units, providing both the front and back sides of the document with equal image quality.

DETAILED DESCRIPTION OF THE INVENTION

Figure 1:
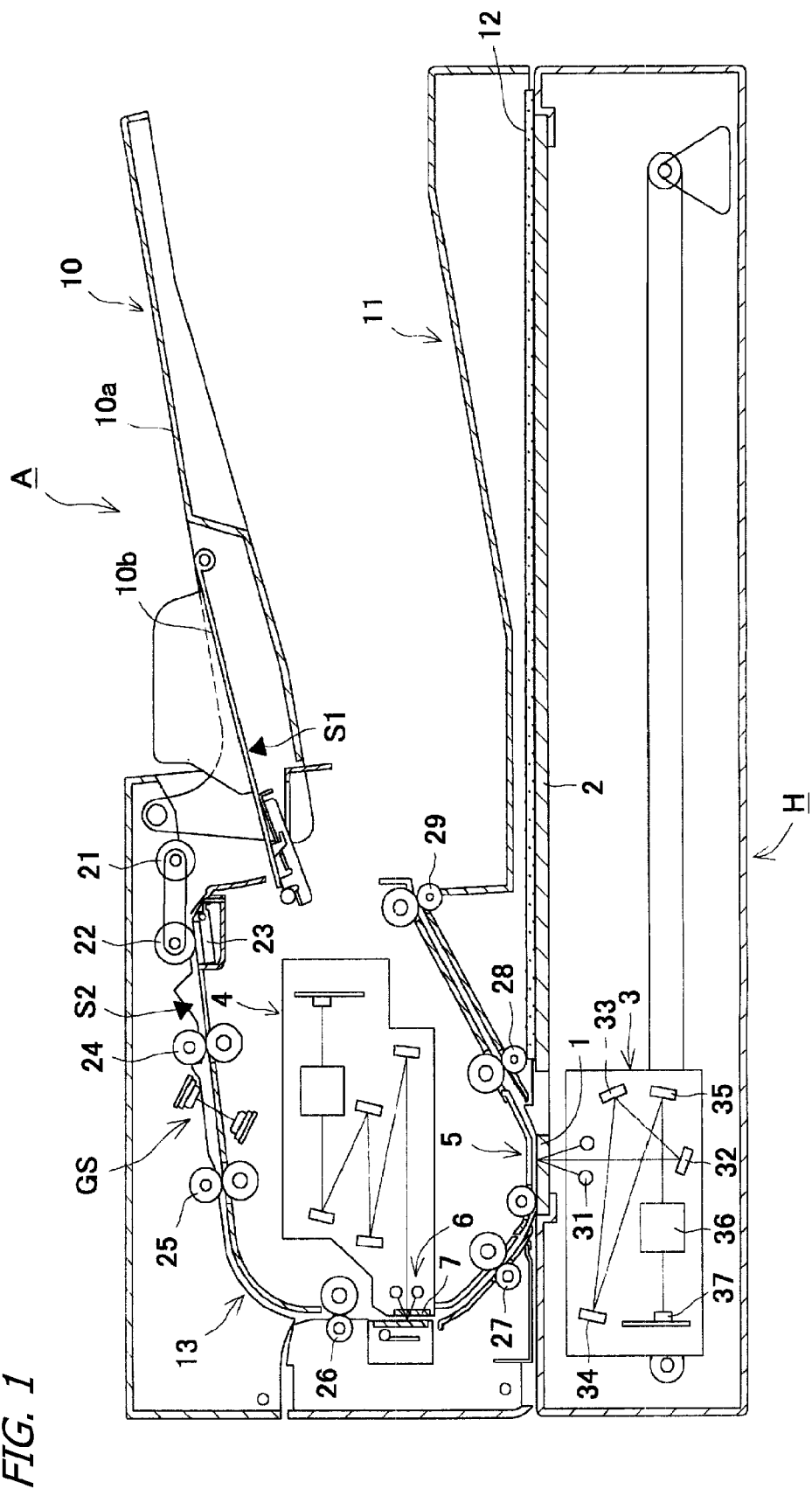
FIG. 1 is a sectional view showing an entire document data capturing device including a document feeding device according to the present invention.
Figure 2:
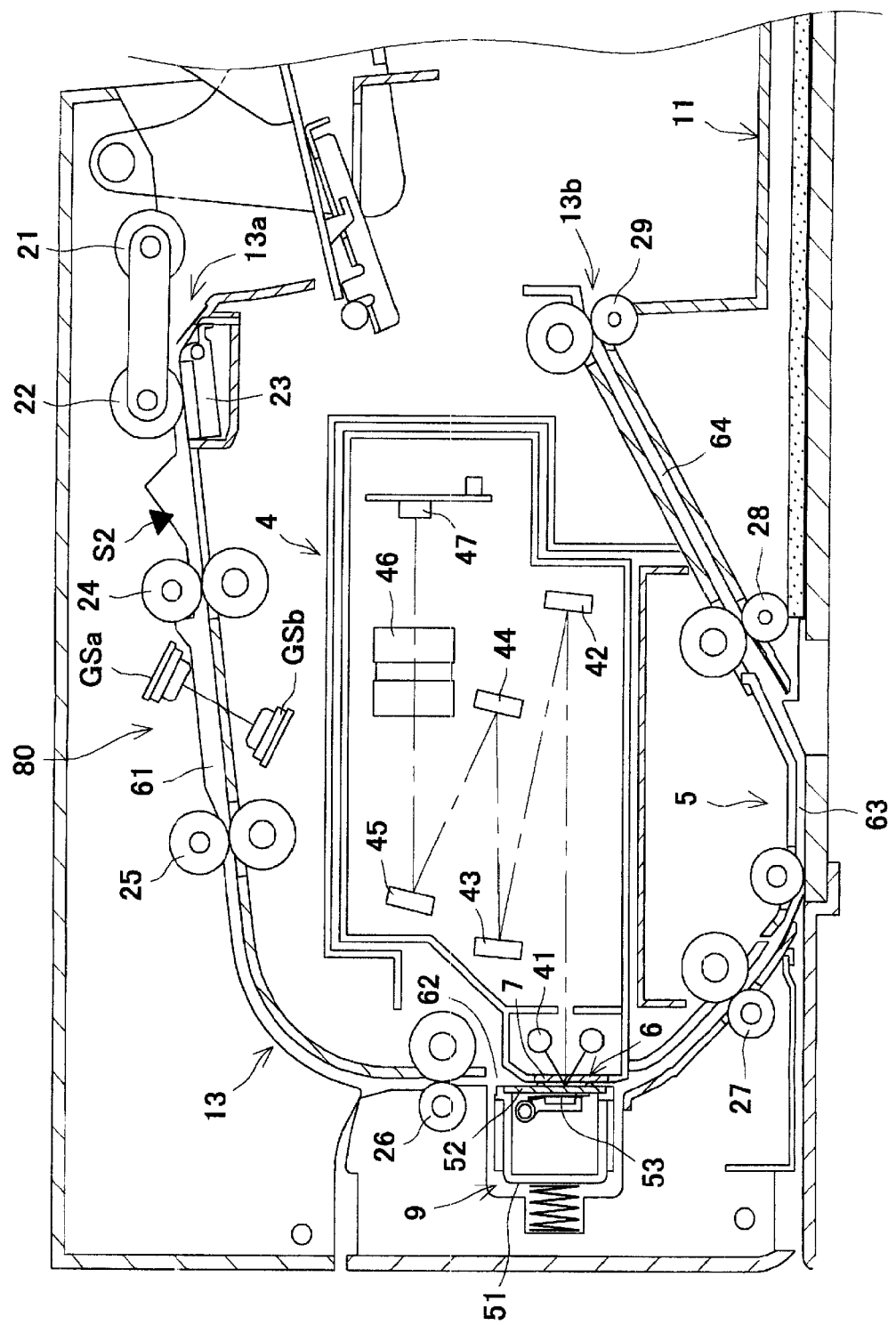
FIG. 2 is an enlarged sectional view showing a configuration of the document feeding device according to the present invention.

FIG. 1 is a sectional view showing a document data capturing device in which a document feeding device is mounted. FIG. 2 is a partly enlarged sectional view of the document feeding device.

In FIG. 1, reference character A denotes a document feeding device mounted over a document data capturing device body H. The document feeding device A conveys and passes a document over first platen glass 1 provided on a top surface of the document data capturing device H. A top surface of the first platen glass 1 over which the document passes makes up a first scanning section 5 that reads the document.

The document data capturing device H includes a first reading unit 3. The first reading unit 3 is composed of a light source 31 such as a lamp which irradiates the document with light, a plurality of mirrors 32, 33, 34, and 35 that guide reflected light from the document in a predetermined direction, a lens 36 that focuses the reflected light guided by the plurality of mirrors, and a photodiode 37 that photoelectrically converts the light focused by the lens 36.

In this configuration, the first reading unit 3 irradiates the document with light emitted by the light source 31, via the platen glass 1. A vertical fraction of the reflected light is reflected by the first mirror 32. Reflected light from the first mirror 32 is then reciprocated, by the second, third, and fourth mirrors 33, 34, and 35, in a horizontal direction crossing a vertical light path leading from a document surface to the first mirror 32. The light reciprocatingly reflected by the second, third, and fourth mirrors 33, 34, and 35 is then guided to the photoelectric conversion means 37 such as a CCD via the lens 36. The guided light is converted into data by the photoelectric conversion means 37. The data is stored in storage means (not shown in the drawings) such as a memory.

The document data capturing device H includes second platen glass 2 located adjacent to the first platen glass 1. The second platen glass 2 is configured such that a thick document such as a book or a magazine can be placed on the second platen glass 2 via the document feeding device A opened upward, with a document image read from the document by moving the first reading unit 3 in a sub-scanning direction.

The document feeding device A includes a sheet supply tray unit 10 on which the document is placed, a sheet discharge tray 11 located on a downstream side of the sheet supply tray unit 10 and in which the document from which the document image has been read by the document data capturing device H is housed, a press cover 12 that presses the second platen glass 2, and a U-shaped conveying path 13 along which the document is conveyed from the sheet supply tray unit 10 to the sheet discharge tray 11. The press cover 12 is composed of, for example, a porous member such as a sponge and a film member such as a white myler sheet. The sheet supply tray unit 10 is composed of a sheet supply tray 10a that supports a trailing end side of the document and an elevating and lowering tray 10b that elevates and lowers between a set position where the document is placed on the sheet supply tray 10a and a pay-out position where the document is paid out.

The U-shaped conveying path 13 is composed of a sheet supply path 61 along which the document from the sheet supply tray unit 10 is guided in the horizontal direction, a first reading path 62 that changes a guiding direction of the document fed along the sheet supply path 61 to guide the document in the vertical direction, a second reading path 63 that changes the guiding direction of the document fed along the first reading path to guide the document in the horizontal direction and in a direction opposite to that in which the document is fed along the sheet supply path 61, and a sheet discharging path 64 disposed continuously with the second reading path 63.

Parts of the sheet supply path 61, first reading path 62, second reading path 63, and sheet discharging path 64 of the U-shaped conveying path 13 which are different from those in which the direction of the document is changed are formed to be straight. Each of the straight parts includes a shingle-feed detection section 80 in which an ultrasonic sensor GS for shingle-feed detection is located, a second scanning section 6 that reads one side of the document, and the first scanning section 5, described above.

Now, the configuration of the document feeding device A will be described in detail. The sheet supply path 61 includes a pay-out roller 21 that pays out the document from the sheet supply tray unit 10, separation means for separately feeding the documents paid out from the pay-out roller 21 one by one, the separation means being made up of a sheet feeding roller 22 and a separating pad 23, a registration roller pair 24 which is configured such that a leading end of the document fed from the sheet feeding roller 22 abuts against a nip point between the rollers and is thus aligned to eliminate skew from the document and which is then driven to feed the document downstream, and a feeding roller pair 25 that feeds the document from the registration roller pair 24 toward the first reading path 62. A straight part of the sheet supply path between the registration roller pair 24 and the feeding roller pair 25 includes the shingle-feed detection section 80 in which the ultrasonic sensor GS for shingle-feed detection is located.

The ultrasonic sensor GS is composed of an oscillating unit GSa located on one side of the straight path between the registration roller pair 24 and the feeding roller pair 25, and a receiving unit GSb located on the other side of the straight path. The oscillating unit GSa and the receiving unit GSb are inclined to a vertical surface of a sheet conveying surface. The receiving unit GSb receives an ultrasonic wave from the oscillating unit GSa to detect shingle-feeding of documents based on a reception level value for the signal received by the receiving unit GSb. Such an ultrasonic sensor is likely to erroneously sense shingle-feeding depending on the condition of the document. Thus, in the present embodiment, the ultrasonic sensor is located in the straight part of the sheet supply path which extends in the horizontal direction. Thus, the ultrasonic sensor detects shingle-feeding of documents in a stable condition and is thus prevented from being erroneously detected.

The first reading path 62 of the U-shaped conveying path 13 includes the second scanning section 6 using a second reading unit 4 to read the document and a first reading roller pair 26 that supplies the document to the second scanning section 6.

As shown in FIG. 2, the second reading unit 4 is made up of a reducing optical system similarly to the first reading unit 5. The second reading unit 4 includes a light source 41 such as a lamp which irradiates the document conveyed on the contact glass 7, with light, a plurality of mirrors 42, 43, 44, and 45 that guide reflected light from the document in a predetermined direction, a lens 46 that focuses the reflected light guided by the plurality of mirrors 42, 43, 44, and 45, and a photodiode 47 that photoelectrically converts the light focused by the lens 46.

In the second reading unit 4, a document passing over the surface of the contact glass 7, forming a part of the first reading path 62, is irradiated with light emitted by the light source 41. Reflected light from the document is then reciprocated in the horizontal direction by the second, third, and fourth mirrors 42, 43, 44, and 45. The reciprocatingly reflected light is then guided to photoelectric conversion means 47 via the lens 46 to read a document image from the document.

An optical pathway from the document surface to the photoelectric conversion means 47 in the second reading unit is formed to be equal to that from the document surface in the first reading unit 5 to the photoelectric conversion means 37. Thus, the first and second reading units 5 and 6 can be composed of the same components such as the same lenses and the same photoelectric conversion means. Thus, the use of the same optical length and the same components enables prevention of a possible difference in image quality between the front and back surfaces resulting from the use of different components or different optical pathways. As a result, acceptable images can be formed.

According to the present embodiment, in the first reading unit 5, the optical pathway from the document surface to the photoelectric conversion means 37 is formed of a vertical optical pathway and a horizontal optical pathway. In the second reading unit 6, the optical pathway from the document surface to the photoelectric conversion means 47 is formed only of a reciprocating parallel optical pathway. That is, since the optical pathway from the document surface to the photoelectric conversion means 37 is formed of the vertical optical pathway and the horizontal optical pathway, the configuration of the apparatus in the sub-scanning direction can be made compact. Furthermore, since the optical pathway from the document surface to the photoelectric conversion means 47 is formed only of the parallel optical pathway, an increase in the height of the apparatus can be prevented even though the reading unit based on the reducing optical system is located inside the U-shaped conveying path 13.

Reference numeral 9 denotes a backup unit provided opposite the contact glass 7. The backup unit 9 is composed of a box-shaped base member 51, backup glass 52 located opposite the contact glass 7 and serving as a conveyance guide, and a shading correcting white member 53 located inside the box-shaped base member 51.

The second reading conveying path 63 of the U-shaped conveying path 13 includes the first scanning section 5, a second reading roller pair 27 that feeds the document one side of which has been read by the second scanning section 6, to the first scanning section 5, and a third roller pair 28 that carries out the document both sides of which have been read by the second scanning section 6 and the first scanning section 5, from the first scanning section 5.

The sheet discharging path 64 of the conveying path 13 includes a first sheet discharging roller pair 29 that receives, from the third reading roller pair 28, the document having passed through the first scanning section 5, where both sides of the document are read, the first sheet discharging roller pair 29 then discharging the document to the sheet discharge tray 11.

Here, as shown in FIG. 2, one horizontal end side of the second reading unit 4 extends to a position located close to an inlet 13a and an outlet 13b of the U-shaped conveying path 13. The U-shaped conveying path 13 is formed to surround the second reading unit 4. A leading end of the sheet supply tray unit 10 and the outlet 13b of the U-shaped conveying path 13 are positioned to overlap the second reading unit 4 in the vertical direction.

Thus, in the present embodiment, the second reading unit 4 extends from a leading end (the position of the first reading path) of the U-shaped conveying path 13 in a sheet feeding direction (horizontal direction) to the vicinity of the inlet 13a and outlet 13b of the path 13. Thus, the optical pathway length of the second reading unit 4 can be increased, thus allowing the second reading unit 4 to be thinned. The conveying path 13 is formed to surround the thinned reading unit 4. Consequently, the apparatus as a whole is made compact. Furthermore, the apparatus is laid out so as to prevent function sections such as the detection section and the scanning section from concentrating in the conveying path on one side of the reading unit. Therefore, the apparatus can be made compact without the need to increase the size of the apparatus in one direction.

Now, a document feeding operation and a document data capturing operation will be described. Provided that an empty sensor S1 has sensed placement of documents on the sheet supply tray unit 10, the pay-out roller 21 and the sheet feeding roller 22 are driven. Thus, the plurality of documents placed on the sheet supply tray unit 10 are sequentially paid out. One document is separated from the remaining documents by the separation pad 23 and then fed. The moment a registration sensor S2 senses the leading end of the fed document, the document starts to be conveyed. The document is then conveyed by a predetermined amount. Thus, the leading end of the document abuts against the nip portion of the registration roller pair 24 to eliminate skew from the document.

Subsequently, the registration roller pair 24, the feeding roller pair 25, and the reading roller pairs 26, 27, and 28 are driven. Thus, the document is conveyed along the U-shaped conveying path 13 so as to be turned upside down; the document passes through the second scanning section 6 and the first scanning section 5 in this order. When the document passes through the second scanning section 6, one side of the document is read. When the document passes through the first scanning section 5, the other side of the document is read. While the registration roller pair 24 is being driven to feed the document, the ultrasonic sensor detects whether or not shingle-feeding of documents is occurring. In this case, when the ultrasonic sensor GS detects shingle-feeding, the conveyance is stopped before reading.

Before the leading end of the document reaches the first sheet discharging roller pair 29, the first sheet discharging roller pair 29 is driven to discharge the document both sides of which have been read by the second scanning section 6 and the first scanning section 5, onto the sheet discharge tray 11.

Thus, in the document feeding device A, the second reading unit 4 reads a document image from one side of the document passing through the second scanning section 6 in the middle of the conveying path 13. The first reading unit 3 reads a document image from the other side of the document passing through the first scanning section 5. Thus, time required to read images from both sides of the document can be drastically reduced.

To read only one side of the document, either the first reading unit or the second reading unit is used.

Figure 3:
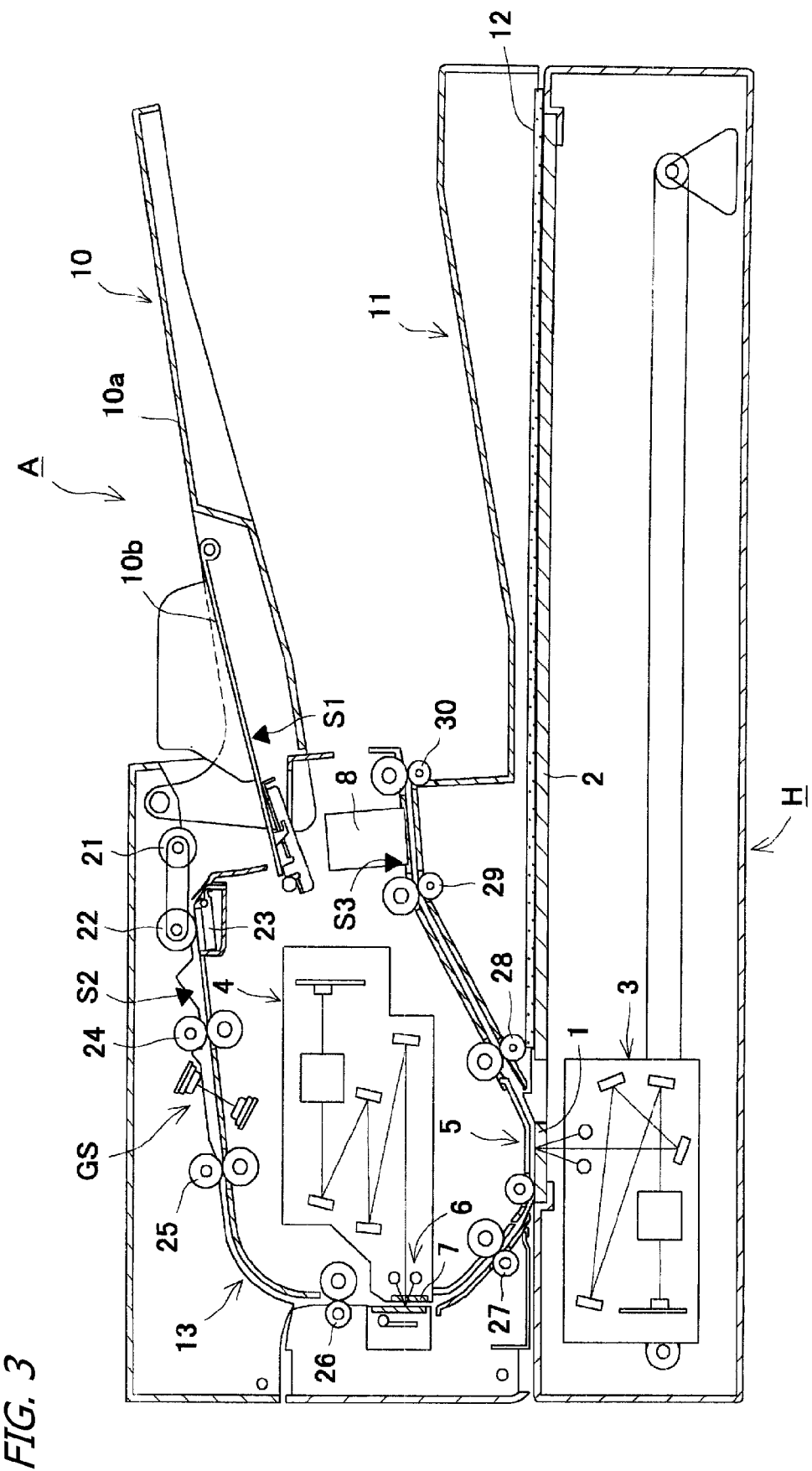
FIG. 3 is a sectional view showing an apparatus of a first variation according to the present invention.

The above-described embodiment performs control such that if the ultrasonic sensor GS detects shingle-feeding, the conveyance of the document is stopped. However, as shown in FIG. 3, a linear path may extend downstream of the sheet discharging path 64, and a second sheet discharging roller pair 30 may be provided which discharges the document onto the sheet discharge tray 11, with an imprinter 8 provided between the first sheet discharging roller 29 and the second sheet discharging roller pair 30. Based on a document detection result from the detection sensor S3, the imprinter 8 can print about five letters on a surface of the document discharged by the first sheet discharging roller 29 and the second sheet discharging roller 30. Thus, if the ultrasonic sensor GS detects shingle-feeding or the first reading unit or the second reading unit makes a reading error, the imprinter can print an error message on the document during a sheet discharging process without the need to stop conveying the document. Consequently, the operator has only to read again only documents subjected to errors after all the documents have been read. This reduces cumbersome operations that the operator otherwise needs to perform.

In the above-described embodiment, the one horizontal end side of the second reading unit 4 extends to the vicinity of the inlet 13a and outlet 13b of the U-shaped conveying path 13. However, as shown in FIG. 4, the one horizontal end may extend past the position of the inlet 13a and output 13b of the U-shaped conveying path 13 to below the sheet supply tray 100.

This configuration will be described in detail with reference to FIG. 4. A reading unit 101 is composed of a light source 102, a first reflection mirror 103 and a second reflection mirror 104, and photoelectric conversion means 106 including a focusing lens 105 and a CCD. An optical pathway from the second reflection mirror to the photoelectric conversion means 104 extends to below the sheet supply tray 100. That is, one end side of the reading unit 101 is attached to a rear surface of the sheet supply tray 100 so that the photoelectric conversion means is located below the sheet supply tray 100. Thus, the reading optical pathway based on the reducing optical system is formed in the space between the sheet supply tray 100 and the sheet discharge tray 11. This enables the reading unit 101 to be further thinned, allowing the apparatus as a whole to be made more compact.

Also in this embodiment, an optical pathway in the reading unit 101 is configured to have a length equal to that of an optical pathway in the first reading unit 3, provided in the document data capturing device body. Reference numeral 100a in FIG. 4 denotes a cover member that covers a part of the reading unit which is positioned below the sheet supply tray 100. The cover member 100a is attached to the rear surface side of the sheet supply tray 100.

Figure 4:
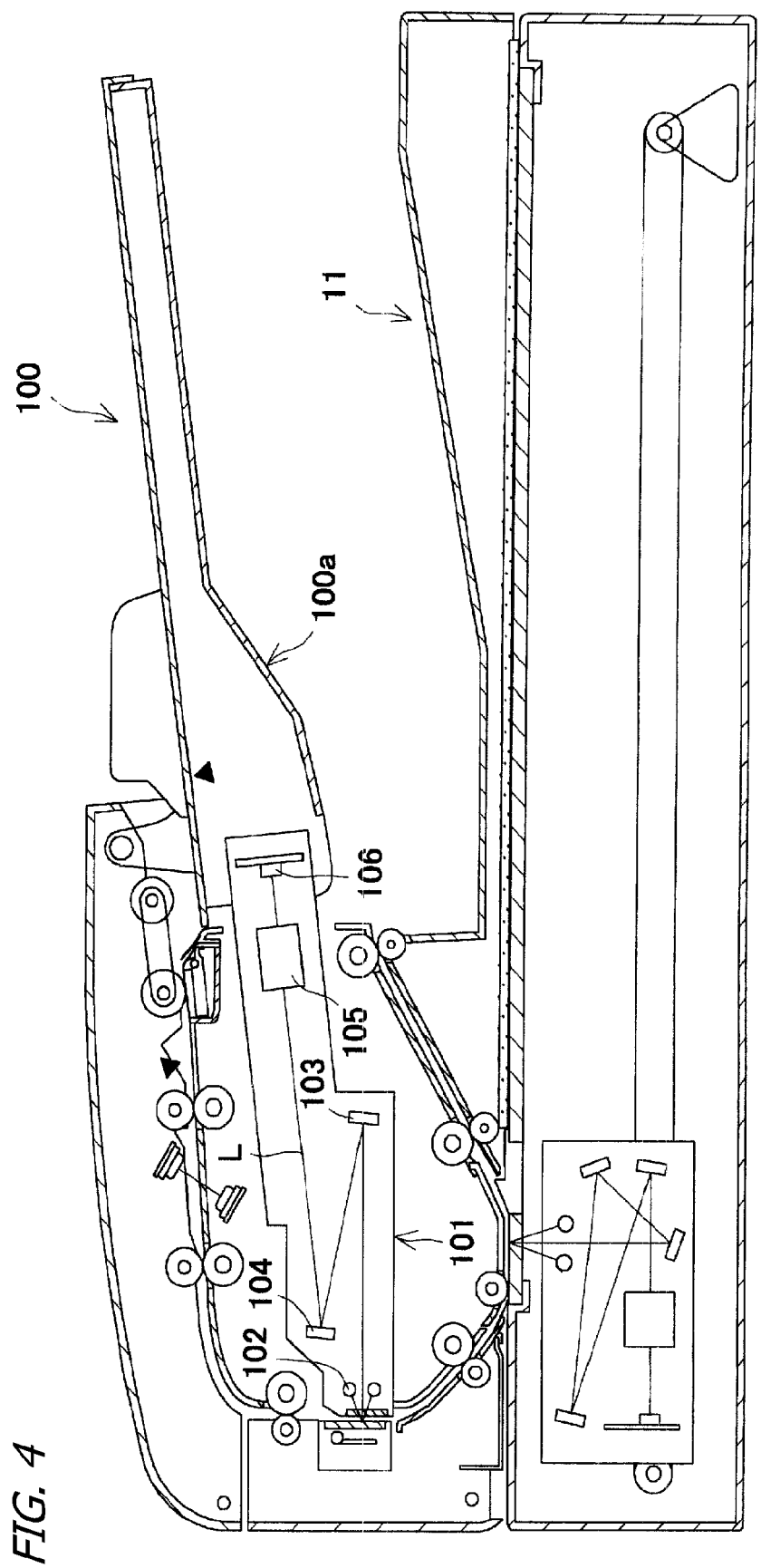
FIG. 4 is a sectional view showing an apparatus of a second variation according to the present invention.

In FIGS. 3 and 4, the same components as those in the above-described embodiment are denoted by the same reference numerals as those in FIG. 1.

What is claimed is:

1. A duplex document data capturing device for capturing data from both sides of a document, the document data-capturing device comprising:
   a sheet supply tray in a sheet-conveyance upstream end of the data capturing device, for carrying documents;
   a sheet discharge tray in a sheet-conveyance downstream end of the data capturing device, for storing documents having been conveyed from the upstream end to the downstream end of the data capturing device;
   a U-shaped conveying pathway arranged in between said sheet supply tray and said sheet discharge tray, and being furnished with a conveying mechanism, for conveying documents from said sheet supply tray to said sheet discharge tray, said conveying pathway constituted by an upstream, substantially horizontal sheet-supply path, a first, substantially vertical scanning path downstream from said sheet-supply path, a second, substantially horizontal scanning path downstream from said first scanning path, and a sheet-discharging path downstream from said second scanning path;
   a first reduction-optics scanning mechanism disposed outside said U-shaped conveying pathway and including a first scanning section formed in said second, substantially horizontal scanning path, for capturing data from one side of a document being conveyed along said conveying pathway via said conveying mechanism;
   a second reduction-optics scanning mechanism disposed inside said U-shaped conveying pathway and including
      a second scanning section formed in said first, substantially vertical scanning path, for capturing data from the other side of a document being conveyed along said conveying pathway via said conveying mechanism,
      a light source, disposed alongside said first scanning path in an area inside said U-shaped conveying pathway, for shining light onto the other side of the document in said second scanning section,
      a photodiode, disposed alongside said sheet discharge tray, horizontally separated from said second scanning section, for photoelectrically converting light reflected from the other side of the document, and
      an optical pathway reaching from said first scanning path to said photodiode, and having
         an initial optical path, formed alongside said second scanning path, for horizontally guiding document-reflection light,
         a final optical path, formed alongside said sheet supply tray, for horizontally guiding document-reflection light, and
         a reciprocating optical path for reciprocating reflection light back and forth along a vertical interval between said initial optical path and said final optical path, wherein
   said second reduction-optics scanning mechanism is surrounded on at least three sides by said U-shaped conveying pathway; and
      a detection mechanism including a detection section disposed in said sheet-supply path, for detecting shingle-feeding of documents conveyed along said conveying pathway via said conveying mechanism.

2. The duplex document data capturing device according to claim 1, wherein each of said detection section, said first scanning section, and said second scanning section forms a rectilinear path.

3. The duplex document data capturing device according to claim 2, wherein:
   said detection mechanism is configured with an oscillating unit for emitting ultrasonic waves, and a receiving unit for receiving ultrasonic waves emitted by said oscillating unit; and
   said oscillating unit and said receiving unit are disposed opposing each other astride said detection section rectilinear path.

4. The duplex document data capturing device according to claim 1, wherein
   said second scanning mechanism is formed so that said optical pathway reaching from said first scanning path to said photodiode is established extending further toward the entrance end of said conveying pathway than does said detection section disposed in said sheet-supply path and said first scanning section formed in said second scanning path.

5. The duplex document data capturing device according to claim 4, wherein
   said sheet-supply path is formed substantially rectilinear.

6. The duplex document data capturing device according to claim 4, wherein a portion of the optical pathway in said second scanning mechanism is formed between said sheet supply tray and said sheet discharge tray.

7. A duplex document data capturing device for capturing data from both sides of a document, comprising:

a sheet supply tray in a sheet-conveyance upstream end of the data capturing device, for carrying documents;

a sheet discharge tray in a sheet-conveyance downstream end of the data capturing device, for storing documents having been conveyed from the upstream end to the downstream end of the data capturing device;

a U-shaped conveying pathway arranged in between said sheet supply tray and said sheet discharge tray, and being furnished with a conveying mechanism, for conveying documents from said sheet supply tray to said sheet discharge tray, said conveying pathway constituted by an upstream sheet-supply path, a first scanning path downstream from said sheet-supply path, a second scanning path downstream from said first scanning path, and a sheet-discharging path downstream from said second scanning path;

a first scanning mechanism disposed outside said U-shaped conveying pathway, for capturing data from one side of a document being conveyed along said conveying pathway via said conveying mechanism;

a second scanning mechanism disposed inside said U-shaped conveying pathway, for capturing data from the other side of a document being conveyed along said conveying pathway via said conveying mechanism, wherein said second scanning mechanism is surrounded on at least three sides by said U-shaped conveying pathway; wherein said first and said second scanning mechanisms each have a light source for shining a light beam onto a document, a plurality of reflection mirrors for reflecting beams from the document, a lens for focusing beams reflected via said reflection mirrors, and a photodiode for photoelectrically converting beams from said lens; and said second scanning mechanism is configured with an optical pathway in which the path of beams reaching to the second-scanning-mechanism photodiode from the surface of a document passing said second scanning mechanism differs from the optical pathway reaching to the first-scanning-mechanism photodiode from the surface of a document passing said first scanning mechanism, and the second-scanning-mechanism optical pathway length is configured to an optical length equal to the length of the optical pathway in said first scanning mechanism.

8. The duplex document data capturing device according to claim 7, wherein:

the optical pathway in said first scanning mechanism is configured via a horizontally reciprocating optical path and a vertically reciprocating optical path; and the optical pathway in said second scanning mechanism is configured via a horizontally reciprocating optical path.

9. The duplex document data capturing device according to claim 8, wherein the optical pathway in said second scanning mechanism is configured in such a way that a portion, but not the entirety, thereof is located between said sheet supply tray and said sheet discharge tray.

* * * * *